Dec. 2, 1941.  E. BUGATTI  2,264,470
CONNECTING DEVICE ESPECIALLY FOR RAILWAY VEHICLES COUPLED TOGETHER
Filed April 21, 1937
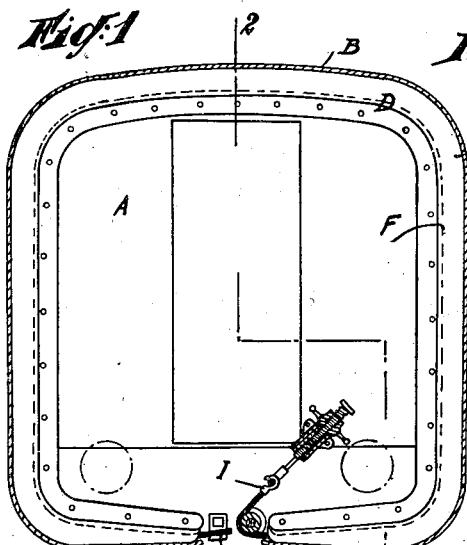
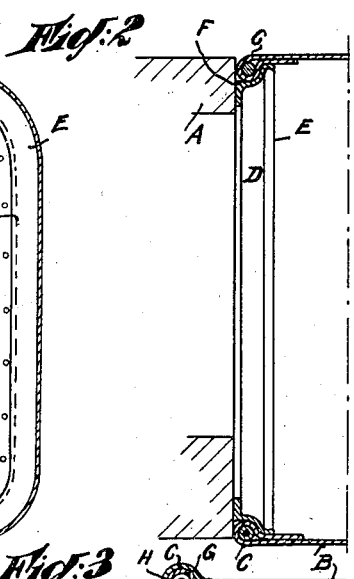
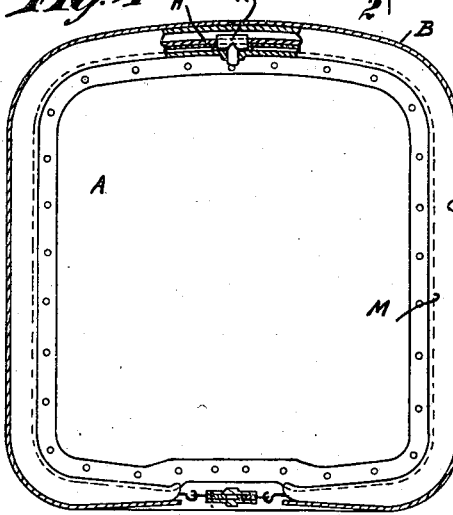
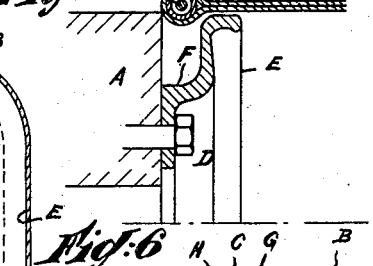
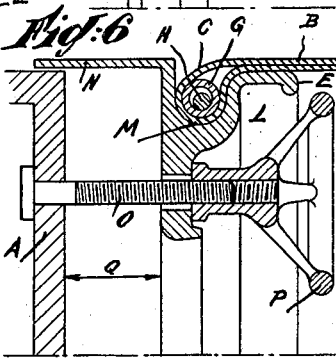
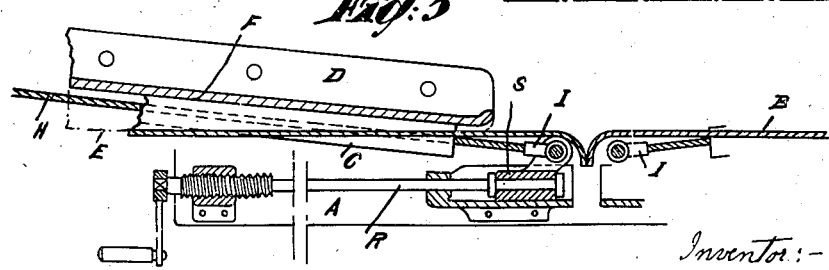
Inventor:—
Ettore Bugatti
By Mauro & Lewis,
Attorneys.

Patented Dec. 2, 1941

2,264,470

UNITED STATES PATENT OFFICE 2,264,470

CONNECTING DEVICE, ESPECIALLY FOR RAILWAY VEHICLES COUPLED TOGETHER

Ettore Bugatti, Molsheim, Bas-Rhin, France

Application April 21, 1937, Serial No. 138,258
In France April 29, 1936

9 Claims. (Cl. 105—15)

For the connection of vehicles which are to communicate together and which are attached to one another, use is made either of plaited bellows or of smooth belts, generally made of an elastic material. These belts are given the preference when the train of vehicles attached to one another is intended to run at high speeds because they produce less perturbation in the flow of air along the train since they permit of joining the cars to one another without sharp projections on the outer surfaces of the bodies of the vehicles. In particular, it is advantageous to make use of their elasticity for fitting them in position with an initial tension, in such manner that their outer surface remains smooth, that is to say is free from plaits, when the relative position of the adjacent ends of the vehicles varies in service, especially when the train is negotiating curves. If the vehicles are not intended to be incorporated in a permanent manner in a set of cars and are intended to be attached or detached at will, it is necessary that the elastic belts should be easily detachable.

The object of the present invention is to provide an improved joining device belonging to the type of elastic belts which are fitted in position with an initial tenson.

According to an essential feature of the present invention, the joining device essentially includes an elastic belt having at both ends welts intended to be engaged above holding edges carried by the adjacent edges of the bodies of two vehicles to be attached to each other.

The belt may be given a tubular shape, in which case the length of each welt is, in the state of rest, smaller than the length of the corresponding holding edge, whereby the welt must be forced into position. The welt, which is supposed to be elastic, must be temporarily expanded so as to permit of forcing it past the edge, after which it contracts in consequence of its elasticity and is thus strongly held behind the edge in question. The welt may be constituted by an elastic cylindrical element, either solid or tubular, around which the edge of the belt is folded. It may, in particular, be made in the manner of an extensible bead of a tire for a vehicle wheel. On the other hand, the edge of the vehicle may be constituted by a mere bar or surface disposed all around the end face of the body and held by arms or brackets at a distance from said case averaging the thickness of the welt. The holding edge may also be constituted by an annular sectional iron either permanently fitted on the body or, on the contrary, removable, and eventually adjustable. This sectional iron may be divided into a plurality of segments, some of which are fixed in a permanent manner, while others are removable, foldable, retractable, and so on. In a general manner the construction of the holding edges of the vehicles may be similar to the construction of vehicle wheels. For instance, the holding edge may be constituted in a manner analogous to the side ring of a rim, and use can be made of a split flange maintained by elasticity in a groove and which is to be expanded for fixing it in position or removing it. Or again I may make use of a flange kept in position by a locking ring. In a likewise manner, I may use a construction analogous to that of so-called "hollow base" rims, that is to say provide behind the holding edge a groove with an eccentric bottom or a groove having equivalent anomalies. With the last arrangements above referred to, it is no longer necessary to make use of an elastic welt, and it is thus possible to reinforce the welt by means of non-extensible reinforcements, such as metallic rods, non-extensible cables, and so on. The holding edge may belong to the body itself, for instance be formed by the surface which limits, on the side of the end of the vehicle, a hollow extending over the periphery of the body near said end.

In another embodiment of the invention, the elastic belt, instead of being of tubular shape, is constituted by a band, in such manner that, once fitted in position, it has the structure of a split tube. In this case, the welt located on either side of the belt may be hollow, and in this hollow there is mounted a cord, a cable, a rod, and so on. In order to give the desired tension, or a portion of this tension, to the elastic belt, I may act upon the cable or its equivalent in such manner as to contact the welt behind the holding edge. This holding edge may be made according to the arrangements above described. As a rule, it constitutes, either alone or in combination with the corresponding body, a gutter in which the welt is engaged. For instance, the gutter may be adjustable with respect to the body, which supplies supplementary means for placing the elastic belt under tension.

Various other features of the present invention will result from the following detailed description of some specific embodiments thereof.

Preferred embodiments of the present invention will be hereinafter described, with reference to the accompanying drawing, given merely by way of example, and in which:

Fig. 1 is a transverse sectional view of an elastic belt in position on the end of a vehicle, according to the invention;

Fig. 2 is a sectional view on the line 2—2 of Fig. 1;

Fig. 3 is a view analogous to Fig. 2, but on an enlarged scale, this view showing a detail of construction;

Fig. 4 is a view analogous to Fig. 1, with parts cut away, this figure corresponding to another embodiment;

Fig. 5 is a detail view in section and on an enlarged scale, this view illustrating a particular tensioning device;

Fig. 6 is a detail view analogous to Fig. 3 and corresponding to the use of a gutter which is adjustable with respect to the vehicle.

In the following description, it will be assumed that the elastic belt is already fixed, either according to the invention, or in any other way, to one of the vehicles to be attached together.

In the embodiment illustrated by Fig. 1, the vehicle A which is to receive the welt C of an elastic belt B is provided on its front face with a peripheral frame D having the shape of a gutter the free edge E of which is substantially flush with a plane prolonging the outer walls of the vehicle body. The bottom D of the gutter is located at some centimeters from the free edge E, toward the center of the front face. Thus it forms a line substantially parallel to edge E. This line is preferably made, in all of its parts, of convex curves.

The elastic belt, in the example illustrated, has, after fitting in position, the shape of a band the width of which is substantially such that, if one of the two welts C is fixed to one of the vehicles, the other welt can be brought without difficulty to the inlet of the gutter, as shown by Fig. 3. The initial width of the elastic belt is substantially equal to that of the periphery of the bottom F of the gutter.

The welt C of the elastic belt is reinforced on the inside with an elastic tube G which may be glued thereto and which is substantially of the same length as the edge of the belt. This tube may be covered with a fabric and separated from the fold of the belt in which it is inserted by a supplementary layer of fabric. The belt itself may be protected by a sheet of fabric on the side through which it lies on the edge E of the gutter. On the inside of this elastic tube there is housed, with a play sufficient for permitting its axial displacement, a cable H, either metallic or not, and the length of which is such that its ends project from both ends of the belt. These ends of cable H are fitted with fixation means I such as hooks, fork-shaped members, and so on, which connect them to tensioning means, or again with fixation means I' carried by the vehicle.

Once the welt C has been brought to the inlet of the groove formed by the front face of the vehicle and frame D, it suffices to tension cable H for causing the welt C of the belt to enter as far as the bottom F of said groove. This latter operation produces a widening of the belt which is thus stretched between the adjacent ends of the respective vehicle to be connected together.

The tensioning device or devices may be of any suitable type. They are preferably positioned at a place which can be reached easily either on the inside or on the outside of the belt according as the case or the needs may be. In the example of Fig. 1, the tensioning device is a screw tensioning device provided with an operating handle.

In the case in which a tensioning device is provided at either end of the cable, or in the case of a tensioning device common to both ends (Fig. 4), a stop piece K, rigid with the middle of the cable and engaging in a suitable housing provided at the top of frame D, is adapted to fix the correct position of the edge of the belt in the gutter of the vehicle and it serves to distribute the tensions to the two tensioning means, when two of them are provided.

For the sake of simplicity and clarity of the drawing, the edges of the elastic belt are shown as distant from each other (Fig. 1 and Fig. 4) or adjacent to each other (Fig. 5), but they may also overlap each other. In the two latter cases, the space between the two end faces of the vehicles connected together is hermetically closed, which prevents the ingress of external air, which would carry along with it dust, rain, and so on, and would cause, eventually, the inner space to be cooled or heated. Furthermore, this arrangement avoids the transmission of the external noises, such as those resulting from the rolling of the vehicle. This overlapping of the ends of the elastic belt is obtained by placing the tensioning devices for one of them on the inside and for the other on the outside of the drum constituted by the belt.

In the embodiment of Fig. 5, the respective ends of the cable H mounted on the inside of welt C are fixed to end pieces I. One of said end pieces I (that on the right, in Fig. 5) is rigidly secured to the structure of the car so as to be fixed in position. The other end piece I (on the left in Fig. 5) is rigid with a sliding member S rotatably mounted on one end of a rod R. The other end of said rod is screw threaded and engaged in a fixed nut, carried by the car structure. This rod can be turned by means of a crank.

It will be readily understood that, with such an arrangement, when the crank is turned, screw threaded rod R is caused to move in the direction of its axis toward the right of Fig. 5, thus tensioning cable H, and tightly applying the corresponding welt against the bottom of the groove in which it is inserted.

In a second embodiment, shown by Fig. 6, the belt is previously fitted, by its welt C, in the groove M of a frame L in the manner above described. Frame L is rigid and its free edge E and also its part N correspond to the shape of the end of the vehicle. The initial tension of the connecting belt is obtained through any suitable tightening device which permits of fixing frame L against the end face of vehicle A, the width of the elastic belt being calculated in such manner that frame L can be brought without effort to a distance Q from the base on which this frame is to bear. The widening of belt B by a value equal to Q at the time of the tightening determines its initial tension. As tightening devices, I may make use of any suitable means, from the mere bolt and nut arrangement (O and P) to the automatic fixation device.

Of course, the above embodiments have been given merely by way of example and other specific arrangements are possible according to the present invention. For instance, the welt might be mounted in a tubular groove provided on the vehicle, and having a C-shaped or similar section, in such manner that the belt projects from the tubular groove through the slot thereof, whereas the welt is kept applied against the lips of said slot. In this case, the belt, which is then constituted by a band, and not by a tube, is introduced into the groove by being inserted longitudinally through one of the ends thereof.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention, as comprehended within the scope of the appended claims.

What I claim is:

1. In a train or the like construction having relatively movable sections with spaces between the ends of adjacent sections, the combination with at least one of said sections of an abutment on the end thereof having an abutment shoulder facing away from the space adjoining said end, of a flexible diaphragm adapted to extend across said space, a welt carried by one edge of said diaphragm applied against said abutment and means for stretching said welt around the outer peripheral face of said abutment, said last mentioned means including a cable incorporated in said welt and a tensioning member interposed between the ends of said cable.

2. In a train or the like construction having relatively movable sections with spaces between the ends of adjacent sections, the combination with at least one of said sections of an abutment on the end thereof having an abutment shoulder facing away from the space adjoining said end, of a flexible diaphragm adapted to extend across said space, a welt carried by one edge of said diaphragm applied against said abutment, and means for stretching said welt around the outer peripheral face of said abutment, said last mentioned means including a cable incorporated in said welt, means for fixing one end of said cable to the structure of said section, and means for pulling the other end of said cable with respect to said structure so as to tension said cable.

3. In a train or the like construction having relatively movable sections with spaces between the ends of adjacent sections, the combination with at least one of said sections of an abutment slidable on the end thereof in the fore and aft direction, said abutment having a shoulder facing away from the space adjoining said end, of a flexible diaphragm adapted to extend across said space and a welt carried by one edge of said diaphragm applied against said abutment, said welt being adapted to be stretched around the outer peripheral face of said abutment as a consequence of a sliding displacement of the abutment away from said space.

4. In a train or the like construction having relatively movable sections with spaces between the ends of adjacent sections, the combination with said sections of abutments on the adjacent ends of said sections having abutment shoulders facing away from each other, of a flexible diaphragm extending between said ends of two adjacent sections so as to inclose the space between said ends, a welt carried by each edge of said diaphragm applied against the corresponding abutment and means for stretching said welt around the outer peripheral face of said abutment, said last mentioned means including a cable incorporated in said welt and a tensioning member interposed between the ends of said cable.

5. In a train or the like construction having relatively movable sections with spaces between the ends of adjacent sections, the combination with said sections of abutments on the adjacent ends of said sections having abutment shoulders facing away from each other, of a flexible diaphragm extending between said ends of two adjacent sections so as to inclose the space between said ends, a welt carried by each edge of said diaphragm applied against the corresponding abutment, and means for stretching said welt around the outer peripheral face of said abutment, said last mentioned means including a cable incorporated in said welt, means for fixing one end of said cable to the structure of the corresponding section, and means for moving the other end of said cable with respect to said structure.

6. In a train or the like construction having relatively movable sections with spaces between the ends of adjacent sections, the combination with said sections of abutments slidable with respect thereto, in the fore and aft direction thereof on the adjacent ends of said sections said abutments having shoulders facing away from each other, of a flexible diaphragm extending between said ends of two adjacent sections so as to inclose the space between said ends, and a welt carried by each edge of said diaphragm applied against the corresponding abutment, said welt being adapted to be stretched around the outer peripheral face of said abutment as a consequence of a sliding displacement of the two abutments of two adjacent sections respectively away from each other.

7. In connection with a train or like construction including relatively movable sections with spaces between the ends of adjacent sections, a device for joining said sections which comprises, in combination, an abutment on the end of at least one of said sections having an abutment shoulder facing away from the space adjoining said end, a flexible diaphragm adapted to extend across said space, a welt carried by one edge of said diaphragm applied against said abutment shoulder and extending around said train section end, said welt being in tension, said welt including a cable incorporated therein, and means for tensioning said cable peripherally around said train section end.

8. In connection with a train or like construction including at least two relatively movable sections with a space between the ends thereof, a device for joining said sections which comprises, in combination, an abutment on the end of each of said sections having an abutment shoulder facing away from said space, a flexible diaphragm adapted to extend across said space, welt carried by each edge of said diaphragm applied against said abutment shoulder and extending around said train section end, each of said welts including a cable incorporated therein, and means for tensioning said cable peripherally.

9. A train or like construction having at least two relatively movable sections with spaces between the ends thereof, one of said sections carrying on its end an abutment having a shoulder facing away from the space adjoining said end; a flexible diaphragm adapted to extend across said space, and means carried by the edge of said diaphragm so as to confine said edge against said abutment shoulder, said means comprising a cable under tension.

ETTORE BUGATTI.